Figures 1, 2:
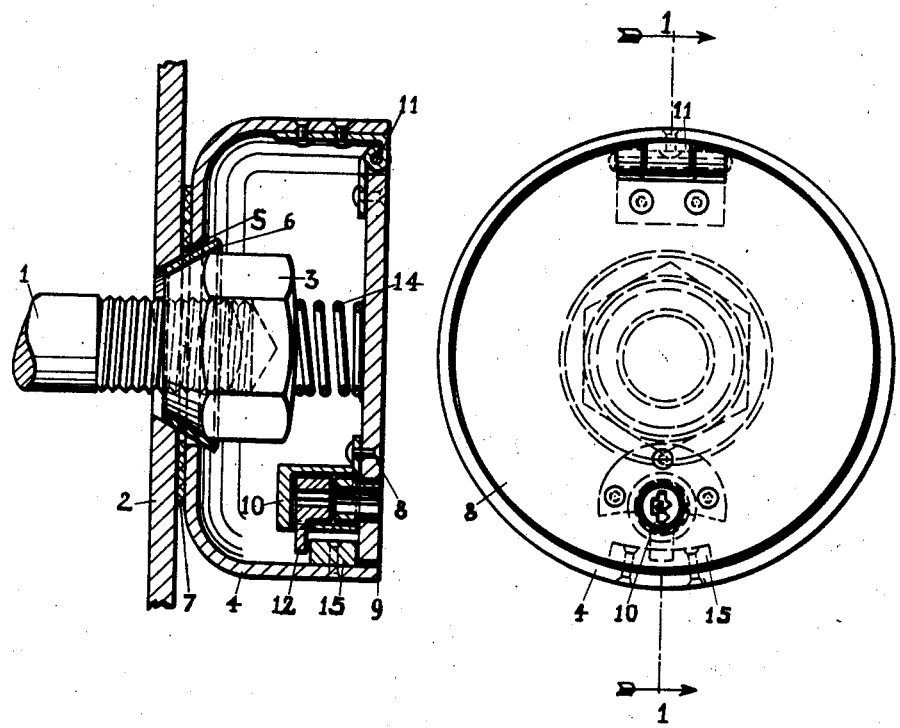

Patented June 29, 1943

2,323,058

UNITED STATES PATENT OFFICE 2,323,058

NUT GUARD

René Lambert-Carez, New York, N. Y.

Application March 10, 1942, Serial No. 434,113

2 Claims. (Cl. 70—232)

My invention relates to a new and improved nut guard, particularly designed to prevent the theft of wheels and tires from automobiles. To this end my nut guard is made sturdy and light in weight, being primarily in the form of a cap surrounding the nut of a wheel, and is so designed that it can easily be affixed to any normal type of nut, and then can be closed by means of a lock and key to prevent the nut from being unscrewed. Moreover, my nutguard is protected in two ways, as referred to hereinafter, against rattling or becoming loose during the time the wheel to which it is affixed is revolving.

The invention is illustrated in the accompanying drawing in which—

Figure 1 is a vertical section on the line 1—1, Fig. 2; and Fig. 2, a front elevation.

Similar numerals refer to similar parts throughout the several views.

Fractions of the bolt 1 and of a plate 2, which is held by the bolt and the nut, are shown in Fig. 1. In the example shown, 3 is a countersunk capped nut of the type usually used for automobile wheels; however, it will be obvious that my nut guard can also be used with other kinds of nuts. A cap 4 is provided with an aperture 5 in its bottom, and a conical washer 6, around the conical part of the nut, extends partially through this aperture 5, thus holding the cap 4. A ring 7 consisting of fibrous material, preferably felt, is affixed to the outer side of the cap 4, between the cap and the plate 2. This elastic ring 7 not only prevents the cap 4 from hanging loose on the washer 6 and from rattling as the wheel revolves, but it also makes certain that the pressure between washer 6 and cap 4 is considerably less than the pressure between the washer and the plate 2. Thus it will be obvious that when the cap 4 is turned around the washer 6 in an attempt to loosen the nut, the cap cannot take along the washer, and thus it is impossible to loosen the nut in such a manner.

A cover 8 is secured to the edge 9 of the cap and is provided with a lock 10, which can only be opened by means of a key. This cover 8 can be affixed to the cap 4 in any suitable manner, or it can be made entirely removable, and it can be kept closed by any kind of lock. I prefer to secure the cover 8 to the edge 9 of the cap, as in the instance shown, by means of a hinge 11 so that the cover cannot be misplaced or lost, and to keep the cover 8 closed by means of a lock 10 having a latch 12. This latch 12, when it is in the position shown in the drawing, rests against a block 15, which may be secured to the rim of the cap 4 by means of countersunk rivets or in any other suitable manner.

As slight differences in the shape and size of conical washers and nuts are inavoidable, it may happen that the pressure of the cap 4 toward the elastic ring 7 is not sufficient to prevent rattling when the wheel to which my device is attached, revolves at high speed. Therefore, as a second means of preventing rattling, a spring 14 is secured around the inside center of the cover 8 in such a manner that the free end of the spring 14 presses against the top of the nut if the cover 8 is closed, as may be seen in Fig. 1.

It must be understood that various changes as to size, shape and arrangement of the parts can be effectuated without departing from the spirit of the invention or the scope of the annexed claims.

What I claim as my invention and desire to secure by Letters Patent of the United States is:

1. In a nut guard, a conical washer formed to loosely embrace the shank of a bolt and to be confined between a nut on said bolt and the object to be guarded, the wider part of said conical washer protruding over said nut, a housing having a perforated bottom through which the wider part of said conical washer extends and being formed to cap said nut, said housing having a flat pivoted lockable cover and being formed with walls extending at the sides of said nut and said sides being accessible for the manual operation of said nut if said cover is open, and a ring of fibrous material affixed around the perforation of the bottom of said housing at its outer side.

2. A nut guard having in combination, a conical washer formed to embrace the shank of a bolt and to be confined between the conical part of the nut on said bolt and the object to be guarded, the wider part of said conical washer extending over the conical part of said nut; a housing having a rim, a flat pivoted lockable cover, and a perforated bottom through which the wider part of said conical washer extends, the rim and cover of said housing surrounding the sides of said nut in spaced relation thereto and said sides being accessible for manual operation of said nut when the cover of said housing is open; and a ring of fibrous material affixed to the outer side of the perforated bottom of said housing around the perforation.

RENÉ LAMBERT-CAREZ.